No. 688,591. Patented Dec. 10, 1901.
G. W. CARY.
MOTOR VEHICLE.
(Application filed July 9, 1900.)
(No Model.) 3 Sheets—Sheet 1.

WITNESSES. INVENTOR:

No. 688,591.  
Patented Dec. 10, 1901.

G. W. CARY.
MOTOR VEHICLE.
(Application filed July 9, 1900.)

(No Model.)
3 Sheets—Sheet 2.

WITNESSES:
INVENTOR:

No. 688,591. Patented Dec. 10, 1901.
G. W. CARY.
MOTOR VEHICLE.
(Application filed July 9, 1900.)
(No Model.) 3 Sheets—Sheet 3.

WITNESSES: Chas. W. Luther Jr., B. M. Simms

INVENTOR: George W. Cary
by Joseph H. Miller & Co.
ATTORNEYS

UNITED STATES PATENT OFFICE.

GEORGE W. CARY, OF NEW BEDFORD, MASSACHUSETTS, ASSIGNOR OF NINE-TENTHS TO JOHN V. THUOT, JEAN B. DION, JEAN B. GREGOIRE, ULRIC E. COLLETTE, CHARLES CHROCHIER, D. HARMIDAS GAUTHIER, JOSEPH POISSON, HONORE COLLETTE, AND GEDEON POISSON, OF NEW BEDFORD, MASSACHUSETTS.

MOTOR-VEHICLE.

SPECIFICATION forming part of Letters Patent No. 688,591, dated December 10, 1901.

Application filed July 9, 1900. Serial No. 23,001. (No model.)

*To all whom it may concern:*

Be it known that I, GEORGE W. CARY, a citizen of the United States, residing at New Bedford, in the county of Bristol and State of Massachusetts, have invented a new and useful Improvement in Motor-Vehicles, of which the following is a specification.

This invention has reference to an improvement in motor-carriages and other motor-propelled vehicles; and it consists in the peculiar and novel construction and the combination of parts whereby a plurality of motors is supported in the hub of the wheel and supplied with active force through the axle on which the wheel revolves, as will be more fully set forth hereinafter.

In motor-vehicles propelled by the force of steam, gas, or explosive mixtures the engine or motor is usually supported on part of the carriage and connected with one of the axles so as to rotate the wheels connected with the axle, and thereby propel the vehicle. The vibration of the motor and the axle affects the connecting mechanism injuriously. It has also been suggested to mount the motor in one of the wheels and connect the same by means of a crank to the axle.

The object of this invention is to exert a more positive power on the wheel by a plurality of motors carried by the wheel and to inclose the motors in an impervious case forming the hub of the wheel.

Figure 1:
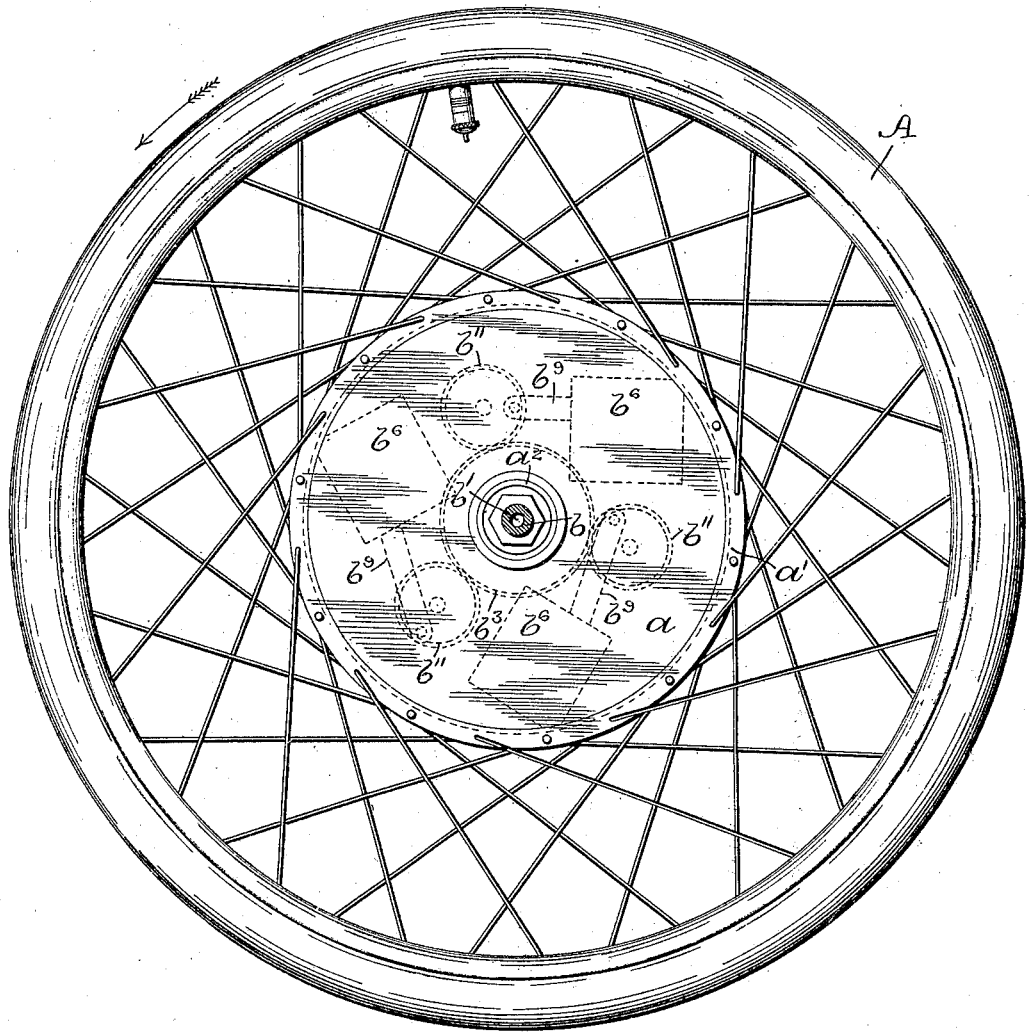
Figure 2:
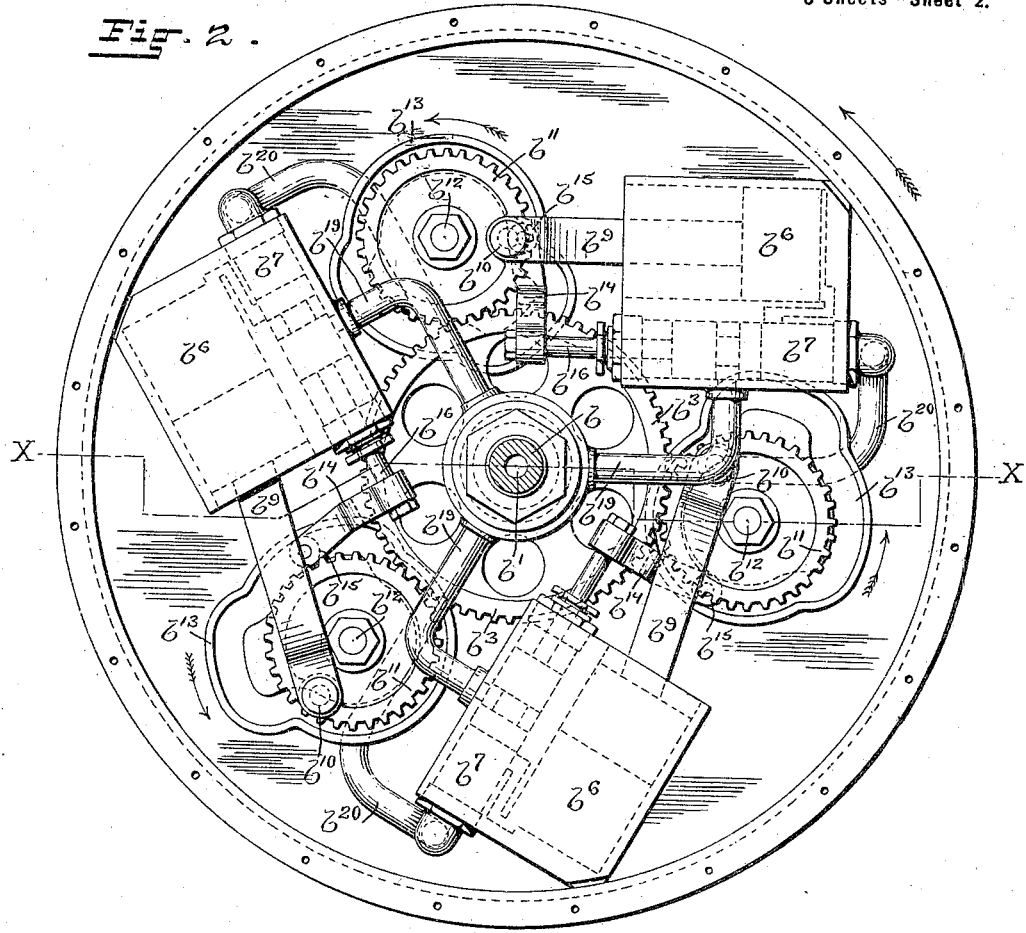
Figure 3:
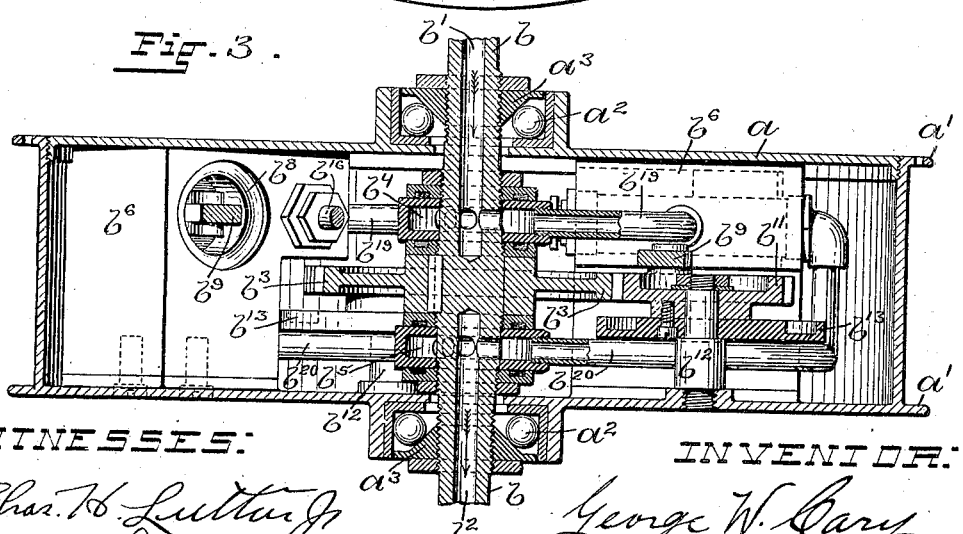
Figure 4:
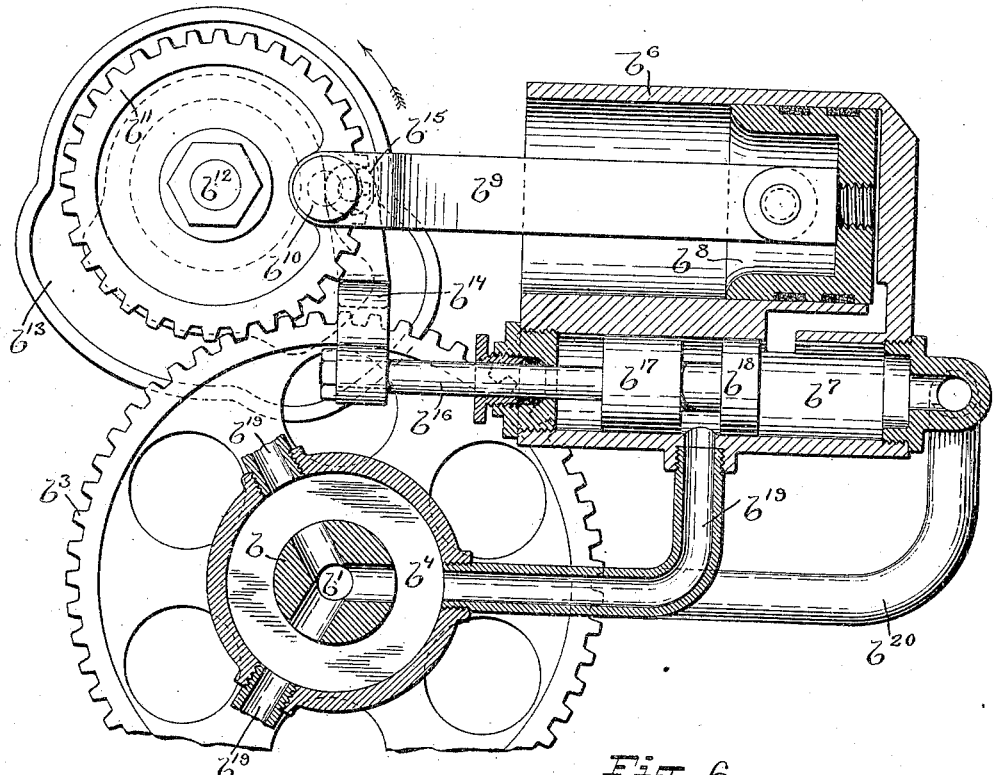
Figure 5:
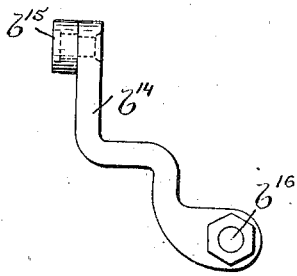
Figure 6:
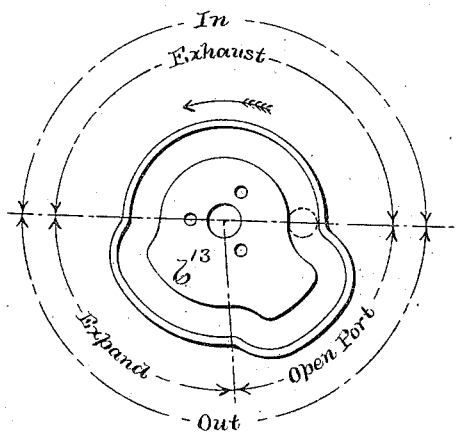

Figure 1 is a side view of a wheel, indicating in broken lines a plurality of motors connected with a central gear. Fig. 2 is a side view of the case forming the hub of the wheel, showing three motors connected to gears which engage with a central gear and cams for controlling the operation of the motors. Fig. 3 is a transverse sectional view of the hub on the line X X of Fig. 2 extending through the axle, showing the connection of the motors to the central gear secured to the axle. Fig. 4 is a sectional view, on an enlarged scale, of one of the motors. Fig. 5 is a side view of one of the arms connecting the valve-stem of one of the motors with the controlling-cam. Fig. 6 is a diagrammatic view showing the motor-controlling cam and operation of the same.

The drawings show the construction and arrangement of the parts as constructed to use steam as the motive force.

Similar marks of reference indicate corresponding parts in all the figures.

In the drawings, A indicates the wheel of a vehicle, which may be of any suitable construction. In the preferred form the construction employed in a bicycle-wheel is used. The cylindrical case $a$, having circular sides, forms the hub of the wheel. The annular flanges $a'$ are perforated to receive the stay-rods of the wheel. The case $a$ is made oil-tight, so that lubricating-oil may be carried in the case to lubricate the moving parts. The two sides of the case $a$ are provided with the roller-bearings $a^2$ $a^2$, the cones $a^3$ $a^3$ of which are adjustably secured to the axle $b$. This axle is provided with the longitudinal duct $b'$, through which steam is conducted to the motors contained in the case $a$, and with the duct $b^2$, by which the exhaust from the motor is discharged.

The gear $b^3$ is rigidly secured to the axle $b$. The annular chamber $b^4$ is rotatably supported on the axle between rings secured to the axle. Radially-disposed openings in the wall of the axle connect the inlet-duct $b'$ with the annular chamber $b^4$. On the opposite side of the gear $b^3$ another annular chamber $b^5$ is rotatably supported on the axle between rings secured to the axle and connects by an opening in the same with the exhaust-duct $b^2$.

The cylinders $b^6$, provided with the valve-chambers $b^7$, are secured to the hub-casing $a$ and rotate with the same around the axle $b$. The piston $b^8$ of each of the cylinders $b^6$ is connected by the connecting-rod $b^9$ with the wrist-pin $b^{10}$, which projects from the gear $b^{11}$, journaled on the post $b^{12}$, which is secured to one of the circular plates of the hub-casing $a$. The cam-plate $b^{13}$ is also journaled on the post $b^{12}$ and is secured to the hub of the gear $b^{11}$, so as to rotate with the same. The arm $b^{14}$ is formed, as shown in Fig. 5, so as to avoid contact with the gear $b^{11}$ and the fixed central gear $b^3$. On one end of the arm $b^{14}$ the roller $b^{15}$ is journaled on a stud secured to the arm. The other end of the arm $b^{14}$ is secured to the valve-rod $b^{16}$, which, extending through a stuffing-box, connects with the valves $b^{17}$ and $b^{18}$ in the valve-chamber $b^7$.

The steam-supply pipe $b^{19}$ connects the annular chamber $b^4$ with the side inlet to the valve-chamber, and the exhaust-pipe $b^{20}$ connects the upper part of the valve-chamber with the annular chamber $b^5$.

The motors are single-acting steam-motors, three of which are preferably used. As shown in Fig. 4, the parts are all in the positions they occupy when the piston has reached the outward stroke and the exhaust of the waste steam is completed. The valve is moved to supply the steam for the next stroke as is shown in Fig. 6.

The three gears $b^{11} b^{11}$ engage with and travel around the gear $b^3$ as they would on a fixed circular rack and carry the hub-casing, on which their journals are secured, with them, thereby rotating the wheel. One or more wheels of a vehicle may be provided with the motors.

Having thus described my invention, I claim as new and desire to secure by Letters Patent—

1. In a vehicle-wheel, in combination with the hub of the wheel, of a multiple of motors secured to and turning with the wheel, gears connected with and turned by each of the motors and journaled on posts secured to the hub of the wheel, and a fixed central gear supported on a fixed part of the motor, the gears connected with the motors rolling on the central gear, as described.

2. In a vehicle-wheel, the combination with the wheel, of a central gear, and a multiple of motors each connected with a gear journaled on a post and engaging with the central gear, as described.

3. In a vehicle-wheel, the combination with the axle, ducts in the axle, and a gear secured to the axle, of an annular steam-supply chamber, an annular steam-exhaust chamber, a multiple of steam-motors secured to the wheel, gears in mesh with the central wheel and journaled on posts secured to the wheel, connections between the pistons of the motors and the gears, and steam-supply and steam-exhaust connections between the annular steam supply and exhaust chambers, as described.

4. In a motor-vehicle, the combination with the wheel, of a hub consisting of a cylindrical casing, a fixed axle, ducts in the axle, roller-bearings for the casing on the shaft, and a gear on the axle, of a multiple of motors contained in and secured to the hub, gears engaging with the gear on the axle and journaled on posts secured to the casing, connections between the gears and the motors, and connections between the motors and the ducts in the axle, as described.

5. A motor for vehicles having a plurality of cylinders, valve-chambers connected with the cylinders, a central gear, gears engaging with the central gear, connections between the gears and the pistons of the cylinders, cam-plates secured to and rotating with the gears, valves in the valve-chambers, connections between the cam-plates and the valve-stems of each motor, and steam-supply connections and steam-exhaust connections with the valve-chambers, as described.

6. In a motor of the nature described, the combination with a central gear, of the cylinder $b^6$, the valve-chambers $b^7$, the pistons $b^8$ in the cylinders, the gears $b^{11}$ engaging with the central gear, the connecting-rods $b^9$ connecting the pistons $b^8$ with the wrist-pins on the gear $b^{11}$, the cam-plates $b^{13}$ secured to and turning with the gears $b^{11}$, the piston-rods $b^{16}$ provided with the valves $b^{17}$ and $b^{18}$, the arm $b^{14}$ connecting the cam-plate with the piston-rod to operate the valves, connections between the steam-supply and the valve-chambers, and connections between the valve-chambers and the exhaust-duct, whereby the steam-supply and the exhaust are automatically controlled to operate the motors successively, as described.

In testimony whereof I have signed my name to this specification in the presence of two subscribing witnesses.

GEORGE W. CARY.

Witnesses:
J. A. MILLER, Jr.,
A. E. HAGERTY.